(12) United States Patent
Veemboor et al.

(10) Patent No.: US 12,028,386 B1
(45) Date of Patent: Jul. 2, 2024

(54) SYSTEM AND METHOD FOR TESTING UPGRADES TO SaaS APPLICATIONS IN A LIVE CLOUD ENVIRONMENT

(71) Applicant: POWER ADVOCATE, INC., Boston, MA (US)

(72) Inventors: Proneel Guptan Veemboor, Acton, MA (US); Scott Perreault, Bridgton, ME (US); Weiming Yan, Winchester, MA (US)

(73) Assignee: POWER ADVOCATE, INC., Boston, MA (US)

( * ) Notice: Subject to any disclaimer, the term of this patent is extended or adjusted under 35 U.S.C. 154(b) by 0 days.

(21) Appl. No.: 18/306,512

(22) Filed: Apr. 25, 2023

(51) Int. Cl.
*G06F 15/173* (2006.01)
*G06F 11/36* (2006.01)
*H04L 65/40* (2022.01)
*H04L 67/567* (2022.01)

(52) U.S. Cl.
CPC .......... *H04L 65/40* (2013.01); *G06F 11/3672* (2013.01); *H04L 67/567* (2022.05)

(58) Field of Classification Search
CPC .................................................. G06F 11/3672
See application file for complete search history.

(56) References Cited

U.S. PATENT DOCUMENTS

2023/0103834 A1\* 4/2023 Jeong .................... G06F 40/242
704/9

\* cited by examiner

*Primary Examiner* — Joseph R Maniwang
(74) *Attorney, Agent, or Firm* — Saul Ewing LLP (57) ABSTRACT

The present disclosure provides a cloud computing system including an application stack including a plurality of service containers including: a unmodified service container in electronic communication with at least one other service container from the plurality of service containers; a test service container in electronic communication with at least one other service container from the plurality of service containers; and a modified test service container in electronic communication with either the at least one unmodified service container or at least one other modified test service container; and an application load balancer to: receive a service request to and from each of the plurality of service containers, a user; determine whether the service request received is from the at least one unmodified service container, the at least one test service container, the at least one modified test service container, the user, or the tester; and route the service request.

22 Claims, 9 Drawing Sheets

SYSTEM AND METHOD FOR TESTING UPGRADES TO SaaS APPLICATIONS IN A LIVE CLOUD ENVIRONMENT

BACKGROUND

For many Software-as-a-Service (SaaS) companies, deploying new and updated software components can be a significant 'last mile' challenge. New software must meet requisite quality standards before it is made available to customers. Customers must not experience any downtime in their access to the application during the feature upgrade period. In other words, end users of the SaaS application may be using one version of the software, offering a given set of features, and in a new instant, or upon re-login, be presented with the next version, offering an updated set of features. Customers have grown to expect 24×7 availability without compromises to regular feature updates from all SaaS vendors.

Software architecture has evolved over time to meet these needs. For software developed for the cloud from day 0, ('cloud-native') software products, 'blue/green' deployments are an established way of meeting the requirement. 'Canary' deployments are a form of 'blue/green' deployments and have been in use for cloud native applications for many years now. In a canary deployment, new software runs alongside the old and starts off with very few users seeing the new software. Over time, more users are diverted to the new software using smart request routing. The system keeps track of errors experienced by users on the new software and stops routing to the new if the error rate on the new software crosses a statistically significant threshold. If all goes well, all user traffic eventually cuts over to the new.

Modern methods such as canary deployments cannot be applied to many enterprises, such as those with very low tolerance for user errors on a new software version or product quality commitments that bar a canary deployment. In other words, canary deployments may expose users to errors (even if temporary), that would be unacceptable.

Existing testing solutions (e.g., in legacy software) include duplicating/replicating the entire application architecture in a "test architecture" and testing features within such a duplicated/replicated application. It would be desirable to use a production environment to test features without needing to duplicate/replicate an entire applications.

Thus, it would be desirable to provide a cloud computing system that addresses the limitations in the art.

SUMMARY

The present disclosure provides a cloud computing system for testing upgrades to a Software-as-a-Service (SAAS) application. The system includes an application stack including a plurality of service containers. The plurality of service containers includes at least one unmodified service container in electronic communication with at least one other service container from the plurality of service containers; at least one test service container in electronic communication with at least one other service container from the plurality of service containers; and at least one modified test service container in electronic communication with either the at least one unmodified service container or at least one other modified test service container). The system also includes an application load balancer configured and adapted to: (a) receive a service request to and from each of the plurality of service containers, a user, or a tester; (b) determine whether the service request received is from the at least one unmodified service container, the at least one test service container, the at least one modified test service container, the user, or the tester; and (c) route the service request based on results from a determining step implemented by the application load balancer.

The present disclosure also provides a method for testing at least one upgrade to a SAAS application in a live cloud environment. The method includes: (a) receiving, at an application load balancer, a service request from a user, a tester, or an application stack, wherein the application stack includes a plurality of service containers including: at least one unmodified service container; at least one test service container; and at least one modified test service container; (b) determining whether the service request received is from the at least one unmodified service container, the at least one test service container, the at least one modified test service container, the user, or the tester; and (c) routing the service request based on the results from the determining step.

The present disclosure also provides a computer-readable media. The computer-readable media includes memory. The computer-readable media also includes one or more processors. The computer-readable media also includes instructions stored in the memory that, when executed, cause the one or more processors to: (a) receive, at an application load balancer, a service request from a user, a tester, or an application stack, wherein the application stack includes a plurality of service containers including: at least one unmodified service container; at least one test service container; and at least one modified version of the test service container; (b) determine whether the service request received is from the at least one unmodified service container, the at least one test service container, the at least one modified test service container, the user, or the tester; and (c) route the service request based on the results from a determining step.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION

Product quality is supported by number of layers, such as code review, automated testing, manual testing in a user acceptance test environment and finally, 'smoke testing' of the new deployment in the production environment. In many testing steps (except, for example, 'smoke testing'), a new application runtime can be built, tested, and discarded, and as a result, is easy to deploy. Smoke testing, however, requires new application runtimes to be deployed, running beside the old, with no service interruption. Unlike canary deployments, it must be entirely invisible to customers until the smoke testing process, whether manual or automated, has run its course.

Deployed applications can be built as one giant 'monolith' where all application code resided in a single runtime. In such an deployed applications, any new features, however limited in scope, require deployment of the entire monolith. Certain deployed applications employ a micro-service architecture for newer products and features. In such micro-service architectures, the application logic is split among multiple (e.g., dozens, hundreds, thousands, etc.) of smaller components and may or may not include the monolith of legacy code. An industry term for such components, deployed to work in cohesion and deliver a set of features to a user, is a 'stack'.

A new product feature may involve changes to only a small subset of micro-services and/or the monolith. This subset may be referred to herein as a 'change set'. Smaller change sets are a best practice, as they can lower risk of error since they likely have less code changed in the update. Smaller changes also makes changes much more frequent, sometimes multiple times a day to different sets of components. A traditional approach to deploying such feature changes in a 'blue/green' model is to create an entirely 'new stack', with a complete snapshot of all new runtimes, whether they had been changed or not, and direct traffic selectively to the old or new stacks. Customer traffic can continue to route to the old stack, while quality control systems (whether run by humans fully or automated) can route to the new, unvalidated stack. Such a model, while serving the purpose, could become cost prohibitive to run as the number of components in the application grow. Larger stacks might also take longer to deploy because, even with parallel processing, they need to wait for all components to be operational before they can receive traffic.

The embodiments described herein provide a programmable browser, a load balancer and a transparent proxy collaborating via a custom protocol to create a 'sub-stack' of modified components that: (a) allow for new code and/or configuration of an application to be deployed and tested in a production environment before releasing to any customer; (b) allow for only the smallest change set to be deployed, reducing cost of operations and turnaround time of deployment; and/or (c) allow the model to be successfully applied to 'legacy' software components that predate modern service-driven architecture and are cost-prohibitive to replace with cloud native equivalents.

A sub-stack is analogous to a subnet in networking in many ways. When devices on a subnet communicate with each other, the traffic does not cross the shared boundary. However, if a device wishes to communicate with another on a different subnet or anywhere on the internet, a router on the subnet provides an access point for that communication. While a router may often be a physical device, in this context, it should be viewed as a logical set of components and protocols that execute the route on behalf of the source and destination.

The disclosure further provides that a similar logical group of components and protocols can engineer communication on an application stack, such that, communication between the tester and the change set remains within the 'sub-stack', while communication with components outside of the change set, whether originating from the tester or the change set itself, is routed correctly to the external component.

Figure 1:
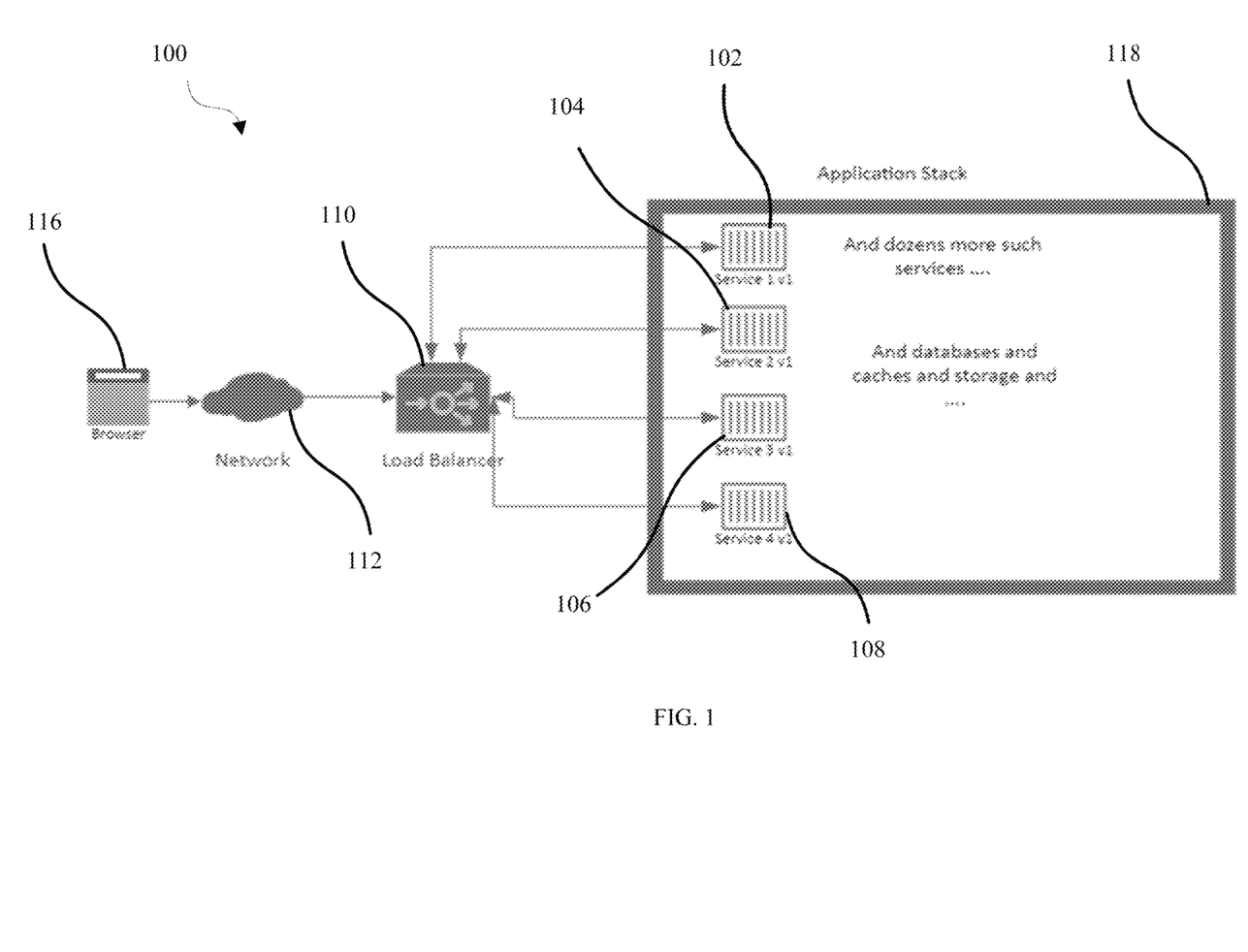
FIG. 1 depicts an application stack prior to a new application version is deployed according to an embodiment of the present disclosure.

FIG. 1 depicts a simplified architecture diagram of a SaaS application that contains only the essential elements required to explain the design. Many elements of standard architecture such as Web Application Firewalls, API Gateways, Web caches, databases, object and file storage, servers, and container clusters etc., have been deliberately left out for brevity.

In certain embodiments, essential elements of the testable application stack 118 (and/or a cloud computing system 100) include: a browser 116 that can used by nearly any user (e.g., customer, prospect, employee, etc.); a collection of services (e.g., services 102, 104, 106, 108) that together comprise a version of product features available to the user (wherein services can run inside a container and the containers isolate the service from other applications that may be executing in the same physical or virtual server); an application load balancer 110 that routes HTTP(S) traffic to various services (e.g., where the traffic can be from the browser 116 to a service or from one service to another) in connection with network 112. Application load balancers 110 can be configured with 'routing rules' that filter requests (e.g., HTTP requests) and forward requests to services that first match the rule, when processed in order. A subset of load balancer rules is shown below:

| Precedence | Rule Filter | Destination |
| --- | --- | --- |
| 1 | Standard routing rule for Service 1 | Service 1 v1 |
| 2 | Standard routing rule for Service 2 | Service 2 v1 |
| 3 | Standard routing rule for Service 3 | Service 3 v1 |
| 4 | And so on . . . | |

In the above example, a "Standard routing rule for Service [X]" is one which routes a request to that service based on URL pathing, HTTP query parameters or another attributes in the request payload.

Figure 2:
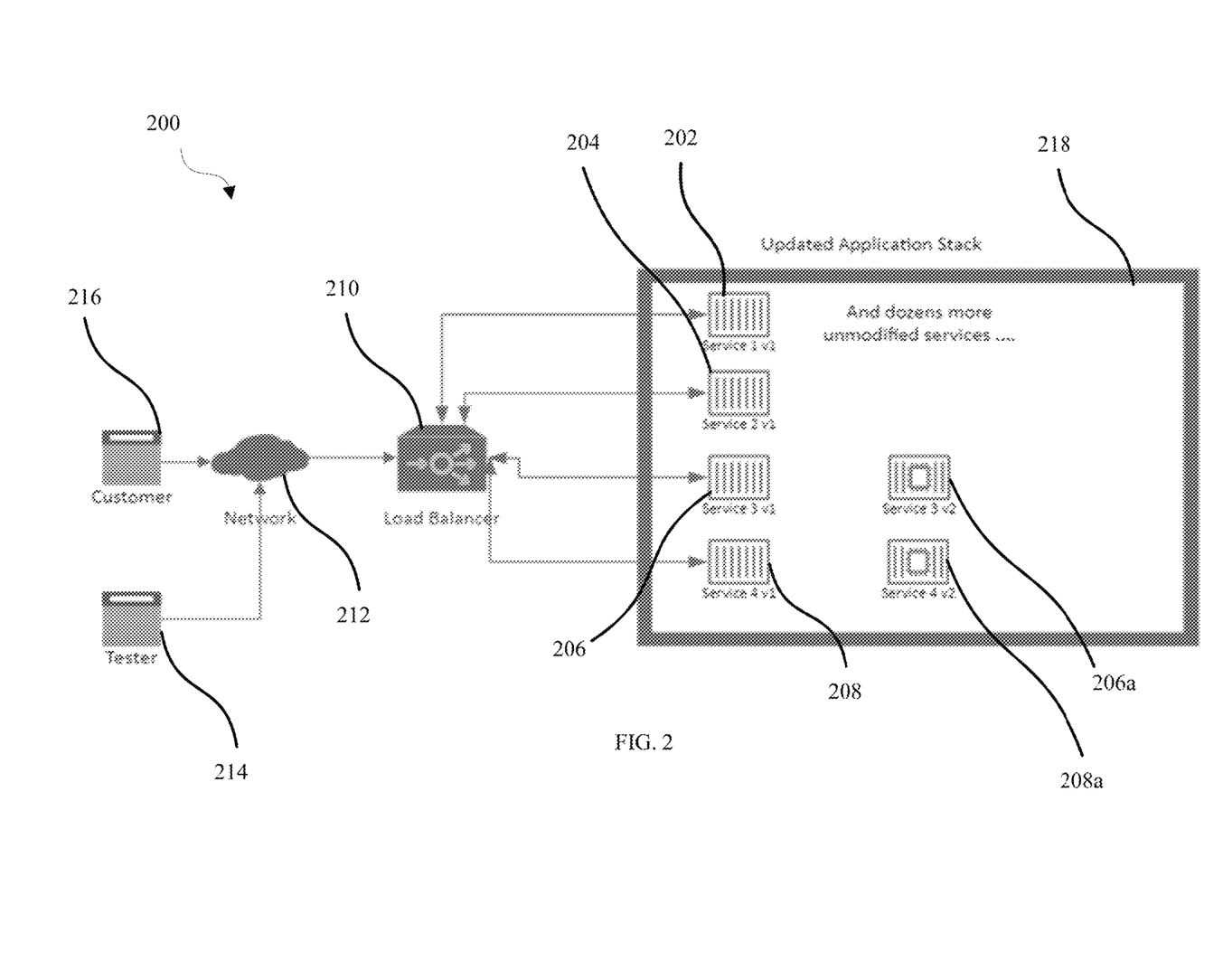
FIG. 2 depicts an application stack with a new version deployed for testing according to an embodiment of the present disclosure.

FIG. 2 depicts a testable application (e.g., cloud computing system 200) according to an embodiment of the present disclosure. FIG. 2 illustrates application stack 218 (e.g., an updated application stack) including a plurality of service containers 202, 204, 206, 208, 206a, and 208a. Load balancer 210 (e.g., an application load balancer) is illustrated in electronic communication with network 212 and each of the plurality of service containers 202, 204, 206, 208, 206a, and 208a. In this embodiment, Services 3 and 4 have two (2) versions of their runtimes. Version v1 indicates an original version (e.g., an unmodified service container) and v2 has feature updates (e.g., a modified service container). None of the other (potentially dozens) of services have been altered in the updated application stack 218 illustrated in FIG. 2. The two services with v2 runtimes (i.e., "Service 3 v2" and "Service 4 v2") have been deployed and are reachable from the load balancer 210, but no routing rules have been setup to do so.

A tester 214 is illustrated connected to network 212 to prepare to test the new product features once the system is fully configured with the change. Tester 214 can be a human (e.g., different from customer 216) exercising product features on a browser or an autonomous system performing similar actions.

Figure 3:
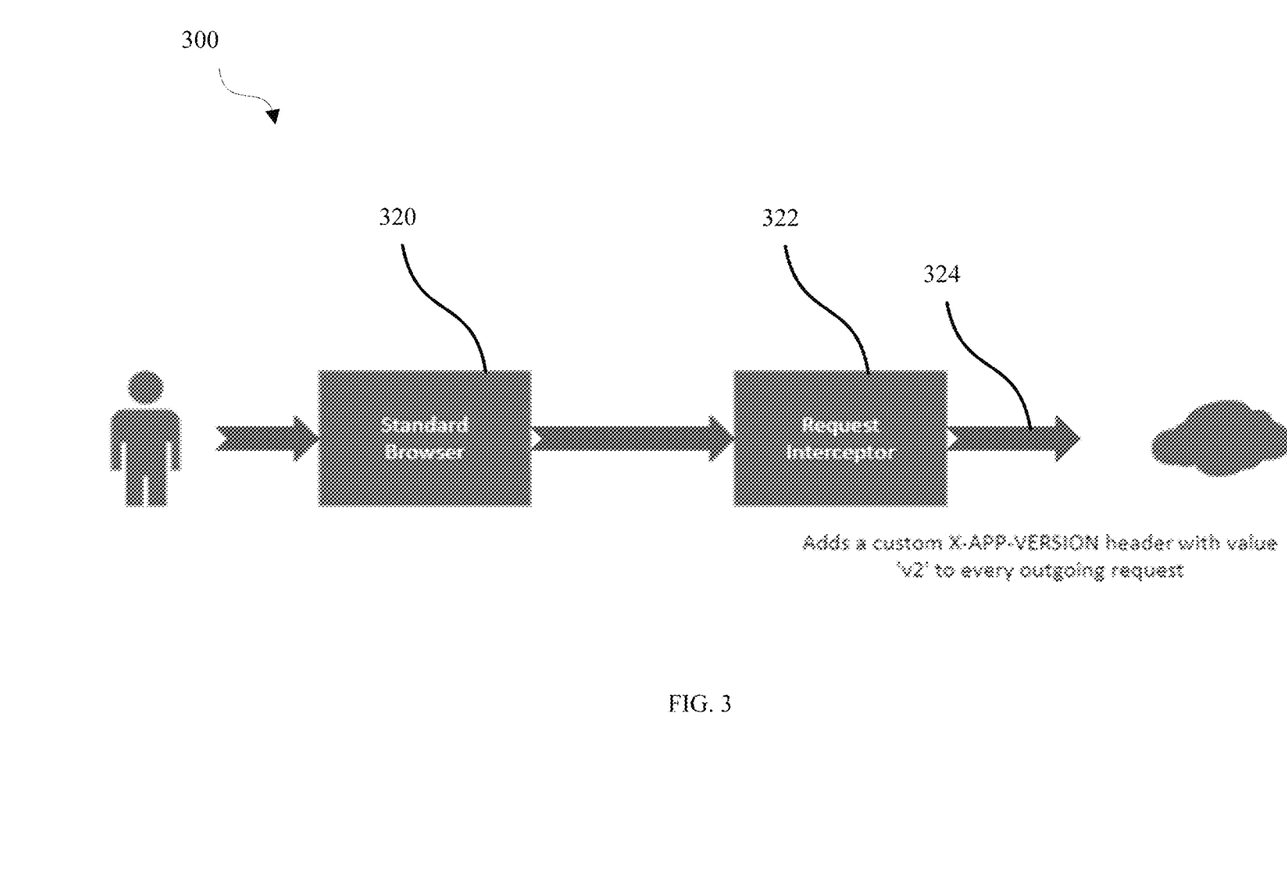
FIG. 3 depicts a programmable browser for a testable application stack according to an embodiment of the present disclosure.

FIG. 3 depicts a programmable browser 300 for a testable application stack according to an embodiment of the present disclosure. The programmable browser 300 is a standard web browser 320 that has been enhanced with a request interceptor 322. The request interceptor 322 is one element of what one might call the 'sub-stack'. It adds a custom HTTP header to all requests 324 that are outbound to the SaaS application.

Any of several techniques to intercept requests and modify the payload may be used for this purpose. However, the testable application stack can use a custom application with an embedded browser and communicating with it via a Developer Tools Protocol for the highest degree of flexibility in implementation.

Figure 4:
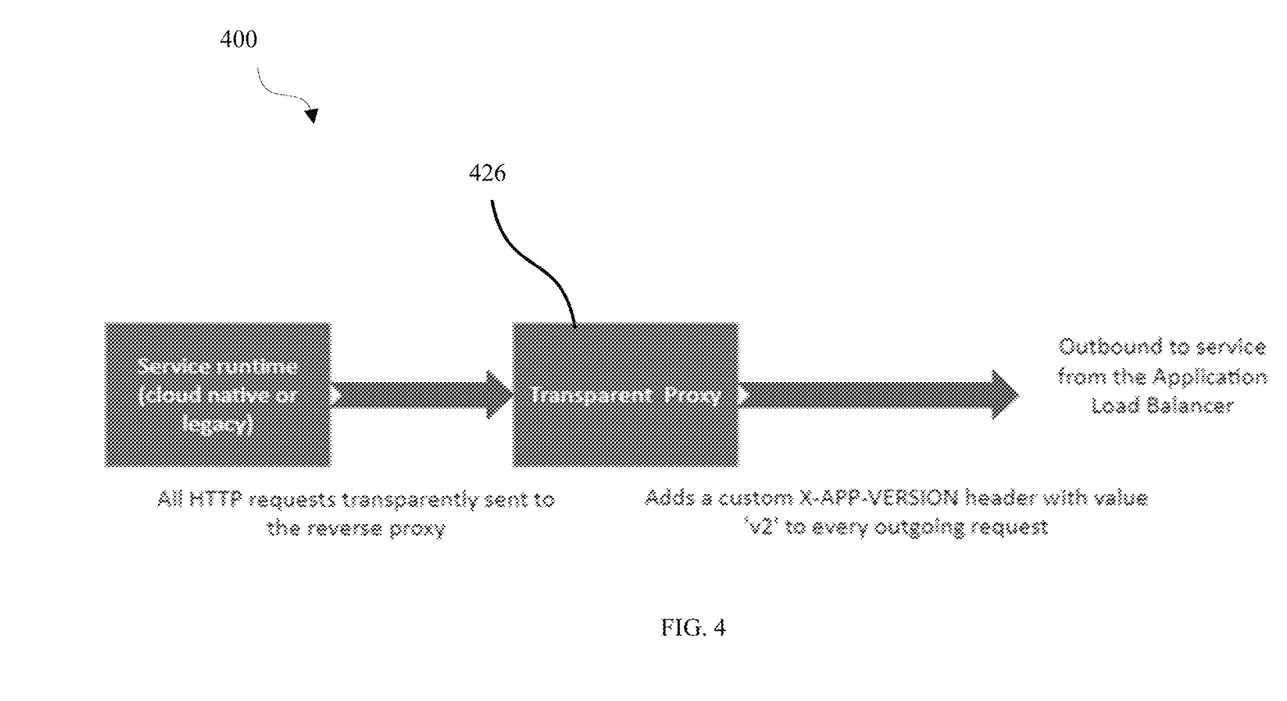
FIG. 4 depicts a service proxy for a testable application stack according to an embodiment of the present disclosure.

FIG. 4 depicts a service proxy 400 for a testable application stack according to an embodiment of the present disclosure. The service proxy 400 is another element of the sub-stack that performs a similar function on the container where the service runtime is deployed. A Transparent Proxy 426 is one that can be configured on the Operating System to forward HTTP requests originating from any process running in the container without the knowledge or intervention of that source process. This transparency is critical for legacy monolith applications that cannot be easily altered for alignment with a micro-service architecture or be replaced for the same effect. Transparent Proxies 426 are easy to setup and configure on modern operating systems (especially on, for example, Linux).

The service proxy is injected into every container that runs a service in the change set (e.g., "Service 3 v2" and "Service 4 v2"). The injection can be achieved by running an 'iptables' command that forwards traffic destined to the Application Load Balancer to first go to the service proxy. The service proxy adds a custom HTTP header to all such requests and then sends them on to the Application Load Balancer. 'iptables' rules are set to prevent this from circular forwarding.

The application load balancer is the third cog in the sub-stack wheel. It is updated with new rules to enable the final set of connections in the sub-stack. This behavior, coupled with the request interception previously described allows requests to remain within the sub-stack for in-sub-stack communication and go on to the 'outer' stack in other cases. The updated load balancer ruleset is shown below:

| Precedence | Rule Filter | Destination |
| --- | --- | --- |
| 1 | Standard routing rule for Service 3 AND X-APP-VERSION = v2 | Service 3 v2 |
| 2 | Standard routing rule for Service 4 AND X-APP-VERSION = v2 | Service 4 v2 |
| 3 | Standard routing rule for Service 1 | Service 1 v1 |
| 4 | Standard routing rule for Service 2 | Service 2 v1 |
| 5 | Standard routing rule for Service 3 | Service 3 v1 |
| 6 | And so on . . . | |

Once the above rules are applied, the new version is fully available to test.

The following process flows will help explain the interaction of the three elements of the sub-stack to provide features described by the disclosure.

Figure 5:
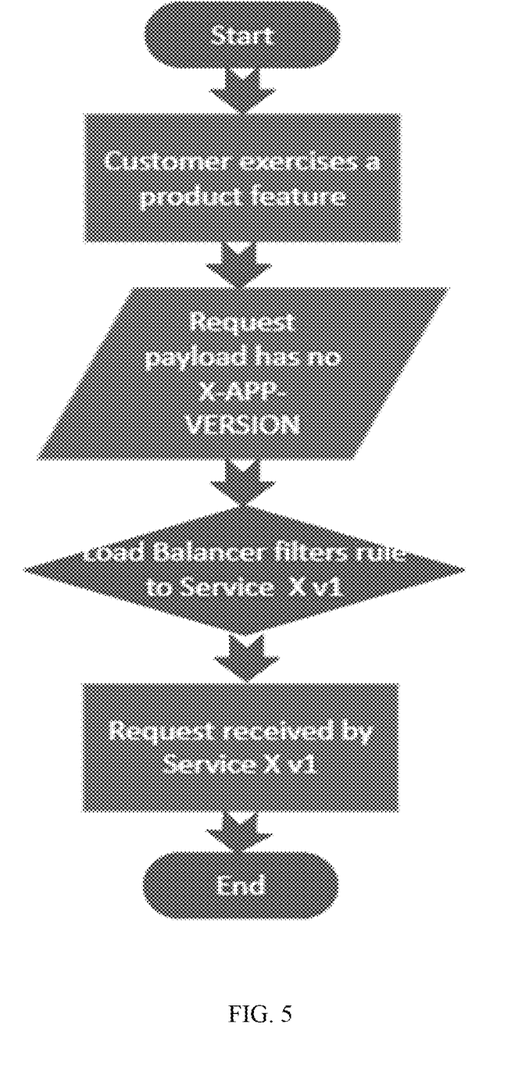
FIGS. 5-9 depicts process flow diagrams for a testable application stack according to an embodiment of the present disclosure.

In FIG. 5, a flow diagram illustrating a customer experience is illustrated. The customer exercises a feature of the SaaS application via their web browser. The customer can use an 'ordinary' web browser, and not one that is customized/programmed. As a result, none of the customer's outbound requests have the sub-stack 'protocol' HTTP X-APP-VERSION header.

The application load balancer filters out any rules which require this header and proceeds to send the request to the appropriate v1 service. If this request results in further inter-service communication (e.g., from Service X to Service Y), they do not have the Transparent Proxy in the middle, and hence no X-APP-VERSION header. As a result, the request continues to be routed to Service Y v1.

Further, as a result, the customer continues to see the stable v1 version of the service, whether through a direct call to a service or indirectly via service-service interaction, satisfying a key tenet of the invention. Note that this applies identically to Services 3 or 4, which were modified, or the unmodified services.

Figure 6:
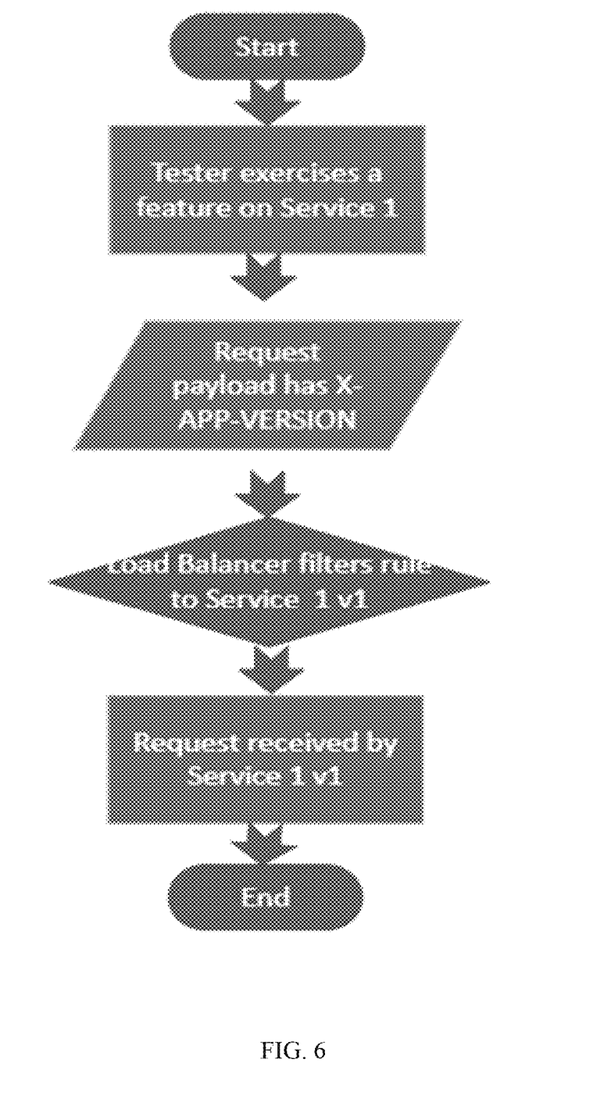

In FIG. 6, the tester exercises a feature of the SaaS application via the programmable browser. As a result, all their outbound requests have the sub-stack 'protocol' HTTP X-APP-VERSION header.

In this flow diagram, the tester is exercising an unmodified service, such as Service 1. The application load balancer does not have any header rule pertaining to Service 1 and proceeds to send the request to the v1 version of the service. If this request results in Service 1 calling Service 2, they do not have the Transparent Proxy in the middle, and hence no X-APP-VERSION header, and as a result continues to be routed to Service 2 v1.

As a result, the tester sees unmodified features of the product exactly as they might expect. Even though some traffic has the X-APP-VERSION header, it does not enter the sub-stack.

Figure 7:
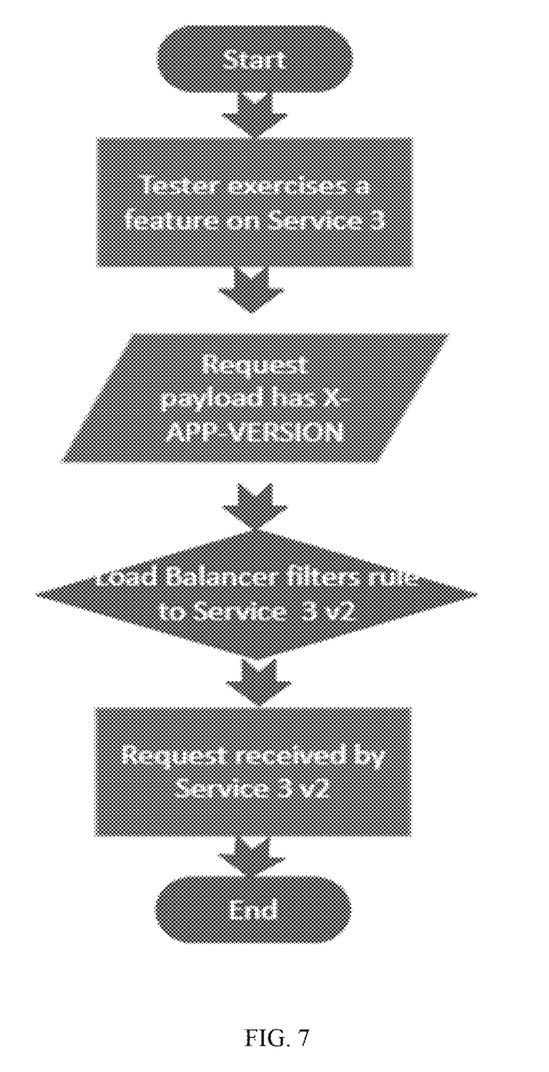

In FIG. 7, the tester exercises a feature of the SaaS application via the programmable browser. As a result, all their outbound requests have the sub-stack 'protocol' HTTP X-APP-VERSION header.

In this flow diagram, the tester is exercising a feature in Service 3 which was modified and deployed as v2. The application load balancer has a higher order header rule match for Service 3 and proceeds to send the request to the v2 version of the service. The rule match for Service 3 without the X-APP-VERSION header is at a lower order and does not take effect in this flow.

As a result, the tester sees modified features of the product exactly as they might expect. That interaction stays within the confines of the sub-stack. The tester exercised Service 3 and that interaction stayed within the sub-stack.

Figure 8:
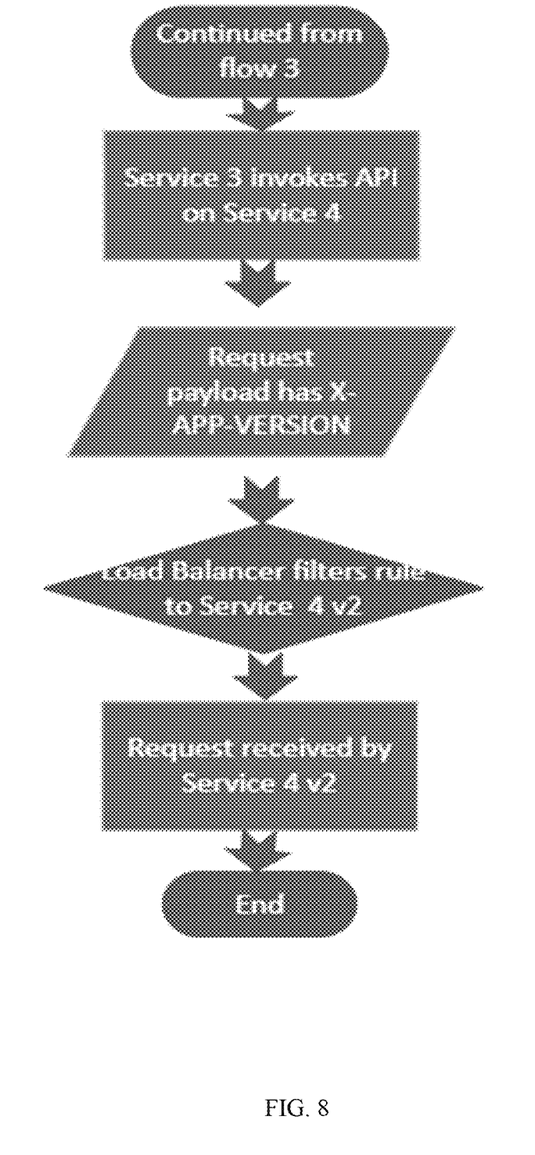

In FIG. 8, Service 3 then goes on to invoke Service 4, which is also a modified service. The calls from Service 3 are transparently intercepted by the proxy, which proceeds to add the X-APP-VERSION header and hands it to the application load balancer.

The application load balancer has a higher order header rule match for Service 4 and proceeds to send the request to the v2 version of the service. The rule match for Service 4 without the X-APP-VERSION header is at a lower order and does not take effect in this flow.

As a result, the tester sees modified features of the product exactly as they might expect, even though the feature is invoked indirectly. This dual-step interaction stays within the confines of the sub-stack.

Figure 9:
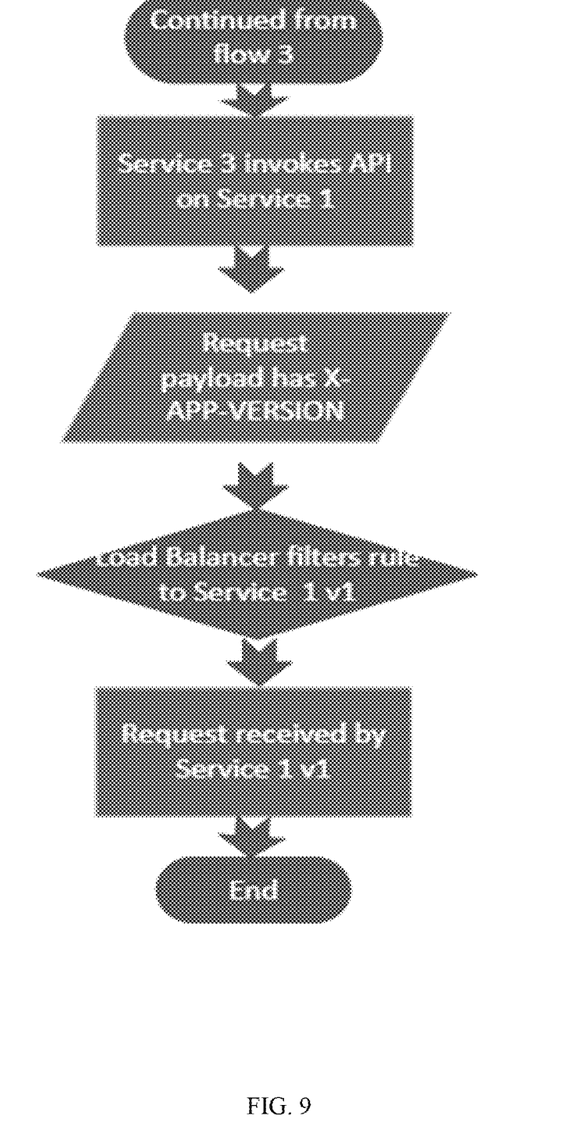

In FIG. 9, Service 3 then goes on to invoke Service 1, which is an unmodified service. The calls from Service 3 are still transparently intercepted by the proxy, which proceeds to add the X-APP-VERSION header and hands it to the application load balancer.

The application load balancer does not have any header rule pertaining to Service 1 and proceeds to send the request to the v1 version of the service.

As a result, the tester sees unmodified features of the product in the indirect flow, exactly as they might expect. The interaction started in the sub-stack but left the sub-stack when it needed to communicate externally.

EQUIVALENTS

Although preferred embodiments of the invention have been described using specific terms, such description is for illustrative purposes only, and it is to be understood that changes and variations may be made without departing from the spirit or scope of the following claims.

ENUMERATED EMBODIMENTS

The following enumerated embodiments are provided, the numbering of which is not to be construed as designating levels of importance.

Embodiment 1 provides a cloud computing system for testing upgrades to a Software-as-a-Service (SAAS) application, the system including an application stack including a plurality of service containers (including: at least one unmodified service container in electronic communication with at least one other service container from the plurality of service containers; at least one test service container in electronic communication with at least one other service container from the plurality of service containers; and at least one modified test service container in electronic communication with either the at least one unmodified service container or at least one other modified test service container); and an application load balancer configured and adapted to: (a) receive a service request to and from each of the plurality of service containers, a user, or a tester; (b) determine whether the service request received is from the at least one unmodified service container, the at least one test service container, the at least one modified test service container, the user, or the tester; and (c) route the service request based on results from a determining step implemented by the application load balancer.

Embodiment 2 provides the cloud computing system of embodiment 1, wherein the determining step comprises identifying whether the service request is modified with an added header, wherein the header indicates that the request is received either from the tester or from the at least one modified test service container.

Embodiment 3 provides the cloud computing system of any one of embodiments 1-2, wherein routing comprises routing the service request received: (i) from the user to the at least one unmodified service container or to the at least one test service container; (ii) from the tester to the at least one modified test service container; and (iii) from the at least one modified test service container to the at least one unmodified service container or to the at least one other modified test service container.

Embodiment 4 provides the cloud computing system of any one of embodiments 1-3, the cloud computing system further including: a modified web browser configured and adapted to receive the service request from the tester; and a request interceptor configured and adapted to modify the service request from the tester by adding the header to it prior to sending the service request to the load balancer.

Embodiment 5 provides the cloud computing system of any one of embodiments 1-4, wherein the modified container comprises a service runtime and a transparent proxy.

Embodiment 6 provides the cloud computing system of any one of embodiments 1-5, wherein the transparent proxy is configured and adapted to modify the service request from the modified test service container by adding the header to it prior to sending the service request to the load balancer.

Embodiment 7 provides the cloud computing system of any one of embodiments 1-6, wherein the system allows for testing the at least one modified test service container in a production environment.

Embodiment 8 provides the cloud computing system of any one of embodiments 1-7, wherein the system allows for optionally modifying the application stack by replacing the at least one test service container with the at least one modified test service container after the testing is complete.

Embodiment 9 provides the cloud computing system of any one of embodiments 1-8, wherein the system allows for incremental testing and upgrading of the application stack.

Embodiment 10 provides a method for testing at least one upgrade to a SAAS application in a live cloud environment (e.g., using the cloud computing system of any one of embodiments 1-9), the method including: (a) receiving, at an application load balancer, a service request from a user, a tester, or an application stack, wherein the application stack includes a plurality of service containers including: at least one unmodified service container; at least one test service container; and at least one modified test service container; (b) determining whether the service request received is from the at least one unmodified service container, the at least one test service container, the at least one modified test service container, the user, or the tester; and (c) routing the service request based on the results from the determining step.

Embodiment 11 provides the method of embodiment 10, wherein the determining step includes identifying whether the service request is modified with an added header, wherein the presence of the header indicates that the request is received either from the tester or the at least one modified test service container.

Embodiment 12 provides the method of any one of embodiments 10-11, wherein routing includes routing the service request received: (i) from the user to the at least one unmodified service container or to the at least one test service container; (ii) from the tester to the at least one modified test service container; and (iii) from the at least one modified test service container to the at least one unmodified service container or to any other modified test service container.

Embodiment 13 provides the method of any one of embodiments 10-12, wherein the method includes receiving, by a modified browser, the service request from the tester.

Embodiment 14 provides the method of any one of embodiments 10-13, wherein the method further includes: modifying the service request from the tester by an interceptor, wherein modifying comprises adding the header to the service request prior to sending it to the load balancer.

Embodiment 15 provides the method of any one of embodiments 10-14, wherein the method includes modifying the service request from the modified test service container by a transparent proxy, wherein modifying comprises adding the header to the service request prior to sending it to the load balancer.

Embodiment 16 provides the method of any one of embodiments 10-15, wherein the method allows for testing the at least one modified test service container in a production environment.

Embodiment 17 provides the method of any one of embodiments 10-16, wherein the method allows for optionally modifying the application stack by replacing the at least one test service container with the at least one modified test service container after the testing is done.

Embodiment 18 provides the method of any one of embodiments 10-17, wherein the system allows for incremental testing and upgrading of the application stack.

Embodiment 19 provides a computer-readable media (e.g., used in connection with the cloud computing system of any one of embodiments 1-9 and/or the method of embodiments 10-18), the computer-readable media, including: memory; one or more processors; and instructions stored in the memory that, when executed, cause the one or more processors to: (a) receive, at an application load balancer, a service request from a user, a tester, or an application stack, wherein the application stack includes a plurality of service containers including: at least one unmodified service container; at least one test service container; and at least one modified version of the test service container (e.g., a modified test service container); (b) determine whether the service request received is from the at least one unmodified service container, the at least one test service container, the at least one modified test service container, the user, or the tester; and (c) route the service request based on the results from a determining step.

Embodiment 20 provides the computer-readable media of embodiment 19, wherein the determining step includes identifying whether the service request is modified with an added header, wherein the presence of the header indicates that the request is received either from the tester or from the at least one modified test service container.

Embodiment 21 provides the computer-readable media of any one of embodiments 19-20, wherein routing includes routing the service request received: (i) from the user to the at least one unmodified service container or to the at least one test service container; (ii) from the tester to the at least one modified test service container; and/or (iii) from the at least one modified test service container to the at least one unmodified service container or to any other modified test service container.

Embodiment 22 provides the computer-readable media of any one of embodiments 19-21, wherein the instructions, when executed, further cause the one or more processors to: (a) receive, by a modified browser, the service request from the tester; and (b) modify, by an interceptor, the service request from the tester by adding the header prior to sending the service request to the load balancer.

Embodiment 23 provides the computer-readable media of any one of embodiments 19-22, wherein the instructions, when executed, further cause the one or more processors to modify the service request from the modified test service container by a transparent proxy, wherein modifying includes adding the header to the service request prior to sending it to the load balancer.

INCORPORATION BY REFERENCE

The entire contents of all patents, published patent applications, and other references cited herein are hereby expressly incorporated herein in their entireties by reference.

The invention claimed is:

1. A cloud computing system for testing upgrades to a Software-as-a-Service (SAAS) application, the system comprising:
   an application stack including a plurality of service containers comprising:
      at least one unmodified service container in electronic communication with at least one other service container from the plurality of service containers;
      at least one test service container in electronic communication with at least one other service container from the plurality of service containers; and
      at least one modified test service container in electronic communication with either the at least one unmodified service container or at least one other modified test service container; and
   one or more processors configured to implement an application load balancer which is configured to:
      receive a service request to and from each of the plurality of service containers, a user, or a tester;
      determine whether the service request received is from the at least one unmodified service container, the at least one test service container, the at least one modified test service container, the user, or the tester; and
      route the service request based on results from a determining step implemented by the application load balancer.

2. The cloud computing system of claim 1, wherein the determining step comprises identifying whether the service request is modified with an added header, wherein the header indicates that the request is received either from the tester or from the at least one modified test service container.

3. The cloud computing system of claim 1, wherein routing comprises routing a service request received:
   (i) from the user to the at least one unmodified service container or to the at least one test service container;
   (ii) from the tester to the at least one modified test service container; and
   (iii) from the at least one modified test service container to the at least one unmodified service container or to the at least one other modified test service container.

4. The cloud computing system of claim 2, further comprising:
   a modified web browser configured and adapted to receive a service request from the tester; and a request interceptor configured and adapted to modify the service request from the tester by adding the header to it prior to sending the service request to the load balancer.

5. The cloud computing system of claim 1, wherein the at least one modified test service container comprises a service runtime and a transparent proxy.

6. The cloud computing system of claim 5, wherein the transparent proxy is configured and adapted to modify the service request from the at least one modified test service container by adding a header to it prior to sending the service request to the load balancer.

7. The cloud computing system of claim 1, wherein the system allows for testing the at least one modified test service container in a production environment.

8. The cloud computing system of claim 7, wherein the system allows for optionally modifying the application stack by replacing the at least one test service container with the at least one modified test service container after the testing is complete.

9. The cloud computing system of claim 8, wherein the system allows for incremental testing and upgrading of the application stack.

10. A method for testing at least one upgrade to a Software-as-a-Service (SAAS) application in a live cloud environment, the method comprising:
receiving, at an application load balancer implemented by one or more processors, a service request from a user, a tester, or an application stack, wherein the application stack includes a plurality of service containers comprising:
at least one unmodified service container;
at least one test service container; and
at least one modified test service container;
identifying whether the service request is modified with an added header to determine whether the service request received is from the at least one unmodified service container, the at least one test service container, the at least one modified test service container, the user, or the tester, wherein the presence of the header indicates that the service request is received either from the tester or the at least one modified test service container; and
routing the service request based on the results from the determining step.

11. The method of claim 10, wherein routing comprises routing a service request received:
(i) from the user to the at least one unmodified service container or to the at least one test service container;
(ii) from the tester to the at least one modified test service container; and
(iii) from the at least one modified test service container to the at least one unmodified service container or to any other modified test service container.

12. The method of claim 10, wherein the method comprises receiving, by a modified browser, a service request from the tester.

13. The method of claim 12, wherein the method further comprises modifying the service request from the tester by an interceptor, wherein modifying comprises adding the header to the service request prior to sending it to the application load balancer.

14. The method of claim 10, wherein the method comprises modifying a service request from the at least one modified test service container of the application stack by a transparent proxy, wherein modifying comprises adding a header to the service request prior to sending it to the application load balancer.

15. The method of claim 10, wherein the method allows for testing the at least one modified test service container in a production environment.

16. The method of claim 15, wherein the method allows for optionally modifying the application stack by replacing the at least one test service container with the at least one modified test service container after the testing is done.

17. The method of claim 16, wherein the method allows for incremental testing and upgrading of the application stack.

18. A non-transitory, computer-readable medium, comprising
instructions that, when executed, cause one or more processors configured to implement an application load balancer to:
receive, at the application load balancer, a service request from a user, a tester, or an application stack, wherein the application stack includes a plurality of service containers comprising:
at least one unmodified service container;
at least one test service container; and
at least one modified version of the test service container;
identify whether the service request is modified with an added header to determine whether the service request received is from the at least one unmodified service container, the at least one test service container, the at least one modified test service container, the user, or the tester, wherein the presence of the header indicates that the service request is received either from the tester or the at least one modified test service container; and
route the service request based on the results from a determining step.

19. The non-transitory, computer-readable medium of claim 18, wherein the determining step comprises identifying whether the service request is modified with an added header, wherein the presence of the header indicates that the request is received either from the tester or from the at least one modified test service container.

20. The non-transitory, computer-readable medium of claim 18, wherein routing comprises routing a service request received:
(i) from the user to the at least one unmodified service container or to the at least one test service container;
(ii) from the tester to the at least one modified test service container; an
(iii) from the at least one modified test service container to the at least one unmodified service container or to any other modified test service container.

21. The non-transitory, computer-readable medium of claim 18, wherein the instructions, when executed, further cause the one or more processors to:
receive, by a modified browser, a service request from the tester; and
modify, by an interceptor, the service request from the tester by adding a header prior to sending the service request to the load balancer.

22. The non-transitory, computer-readable medium of claim 21, wherein the instructions, when executed, further cause the one or more processors to modify the service request from the at least one modified test service container by a transparent proxy, wherein modifying comprises adding the header to the service request prior to sending it to the load balancer.

* * * * *